Reissued Nov. 21, 1933 Re. 19,005

UNITED STATES PATENT OFFICE 19,005

METHOD FOR PRODUCING CEMENT

Elias R. Wilner, New York, N. Y., assignor, by mesne assignments, to The Advance Cement Process Corporation, New York, N. Y., a corporation of New York No Drawing. Original No. 1,785,508, dated December 16, 1930, Serial No. 296,097, July 28, 1928. Application for reissue December 15, 1932. Serial No. 647,436

16 Claims. (Cl. 106—25)

This invention relates to a new hydraulic cement and the process for producing the same, and has for its principal object the production of such a cement at a lower cost than has been heretofore possible, with a lower specific gravity, which is advantageous when weight is a consideration.

As is well known, in the processes heretofore in use, a high fusing heat has been required in connection with the treatment to produce the usual Portland cement clinkers, but by my process a great saving and economy is effected by eliminating these high heats and employing much lower temperatures.

Of the greatest importance as an improvement over heretofore known processes, this product is waterproof, water tight and air tight, and resistant to the action of sea water, acids, fumes, gases and liquids. It is also more elastic, which is advantageous where contraction and expansion must be considered, and more plastic than other cements of the prior art and therefore can be poured more readily than other cements when used in concrete construction.

This deficiency of non-resistance to various materials in Portland cement has been principally the result of the presence of a relatively large proportion of uncombined lime, CaO, which can only be absorbed in actual production by a chemical union with other chemical substances, which are capable of such chemical union.

It has been found by experimentation that the most efficient and economical of such substances for chemical union in the production of cements is silica ($SiO_2$). This mineral in combined form is common to many earths, but with few exceptions, it is found in a dormant, inactive chemical state which prevents its uniting chemically with lime to a sufficient degree unless the silica ($SiO_2$) is treated and made susceptible to the desired chemical union, and this said treatment is another of the objects of this invention. In this new cement the same ingredients are used as in the former processes of producing Portland cement, that is limestone, and clay or shale, no other chemicals being used; but these ingredients are so treated by this new process as to convert a sufficient quantity of silica ($SiO_2$) into its chemical active state, which will enable it to chemically unite with the uncombined lime. In my process, the above named minerals, limestone, clay or shale are separately heated to a relatively much lower degree than that employed in producing the Portland cement clinkers, which require a high fusing heat. These ingredients after being thus heated are mixed in a proportion depending upon immediate conditions, arrived at by a chemical analysis of the two minerals, and then, while preferably still in heated condition, are ground in a suitable mill to a fineness at which the chemical union of the lime and silica ($SiO_2$) will take place, this fineness varying in accordance with conditions.

After this ground material leaves the mill, a fixed quantity of water or steam is introduced and the mixture agitated by suitable mechanical means. Here again the quantity of the water or steam depends upon immediate conditions and a chemical analysis of the raw materials used.

This intimate mixture under the action of the water or steam, aided by the resulting heat, acts to liberate a large proportion of chemically active silica ($SiO_2$) which is capable of the chemical union with the uncombined lime. The resulting product will have all the qualities of Portland cement, and may be used independently in constructions of every description in combination with sand and other materials.

As an example, to produce the above described cement we take 77½% of clay, shale or other silicious earths and heat it separately to 800° Celsius. To this is added 22½% of lime, which has been obtained by heating limestone separately to a temperature sufficient to drive off all the $CO_2$ gases which, depending upon different limestones, will vary between one thousand and twelve hundred and fifty degrees Celsius. The two ingredients are now mixed together, ground to a fineness of 80 per cent passing through a 200 mesh sieve, and then agitated with the addition of 8% of water or its equivalent in steam. Gypsum in small quantities (2 to 4%) may be added, if desired, to retard the setting of the cement.

The above proportions, temperatures and fineness will vary in each case, depending upon the chemical composition of the raw materials used.

The resulting cement will have a twenty to twenty-five per cent lime content, compared with sixty-two to sixty-seven per cent found in existing cements. This smaller lime content will assure the elimination of uncombined lime, which is the important factor in the deterioration of concrete.

The cement can be cheaply produced and will have a much lighter specific gravity than Portland cement. A litre of it loosely packed will weigh six hundred grams as against eleven hundred grams of Portland cement. This greater volume will enable one to produce more solid concrete, that is, having less voids, at a lower cost than with Portland cement.

After hardening, in the above described combination, the chemically active silica ($SiO_2$) and the uncombined lime will be converted into an insoluble double salt, bi-calcium silicate ($2CaO.SiO_2$), which is present in the cement formed, and it will also be found that uncombined lime is present in a very small quantity, and eventually the uncombined lime is entirely absorbed, having been replaced by this double salt.

This product may be advantageously combined with Portland cement clinkers and then ground together, the resulting cement besides retaining the advantages of Portland cement, having also the properties of resisting sea water, acids, fumes and liquids, and of being waterproof, water tight and air tight. The product has also a greater degree of elasticity than other cements heretofore known.

It will be understood by those skilled in the art that in the step of adding water or steam to the lime and silica to obtain chemical union, which is preferably added after the ground material leaves the mill in a separate mixing device having mechanical agitating means, the water or steam might be added in the mill itself after suitable grinding has taken place, the mill serving to sufficiently agitate the materials to bring about the desired reaction. It will be understood also that the water or steam might be added during the mixing operation in the making of concrete, the ordinary mechanical mixing of the ingredients being sufficient to cause substantially complete reaction between the lime and silica and to bring about the desired chemical change in the presence of the sand and rock or other materials employed in the making of the concrete.

I claim:

1. The method of producing a hydraulic cement comprising separately heating limestone to produce quicklime therefrom, heating clay, shale, or other silicious earths to a relatively low point, sufficient to activate the silica of the clay, shale or other silicious earths, mixing the said quicklime and the activated clay, shale or other silicious earths, grinding the said mixture to a suitable fineness, and introducing a jet of water or steam into the mixture under agitation.

2. The method of producing a hydraulic cement comprising separately heating limestone to obtain quicklime therefrom, heating clay, shale or other silicious earths to a relatively low point to convert the silica therein to a chemically active state enabling it to unite chemically with the said quicklime, mixing the said quicklime and the activated clay, shale or other silicious earths, grinding the said mixture to a suitable fineness, and introducing a jet of water or steam into the mixture under agitation.

3. The method of producing a hydraulic cement comprising heating a silicious material to produce silica in the chemically active state, mixing the activated silica material with quicklime to produce a substantially homogeneous admixture and introducing water or steam into the mixture under agitation to effect chemical union of the silica with the said quicklime.

4. The method of producing a hydraulic cement comprising separately heating limestone to form quicklime, and heating clay, shale or other silicious material to a relatively low point to activate the silica therein, mixing the said quicklime and the activated clay, shale or other silicious material in proportions so as to leave substantially no uncombined lime after reaction, agitating the mixed materials to produce a substantially homogeneous admixture and introducing water or steam to produce chemical reaction of the quicklime and silica in the said mixture.

5. The method of producing cement consisting in separately heating lime and clay, shale or other silicious earths to a relatively low point, sufficient to activate the silica of the clay, shale or other silicious earths, mixing the heated lime and the activated clay, shale or other silicious earths, grinding the said mixture to a suitable fineness, and introducing a jet of water or steam into the mixture under agitation.

6. The method of producing cement consisting in separately heating lime and clay, shale or other silicious earths to a relatively low point, mixing the heated lime and activated clay, shale or other silicious earths, grinding the said mixture to a suitable fineness, and introducing a jet of water or steam into the mixture under agitation, the described heating of the clay, shale or other silicious earths being sufficient to convert the silica therein to a chemically active state enabling it to unite chemically with the unabsorbed lime.

7. The method of producing a hydraulic cement which comprises heating unactivated silicious material to a relatively low point to convert the material into the chemically active state and thereafter grinding the said material with quicklime to a suitable fineness and introducing water or steam thereto to form the hydraulic cement.

8. The method of producing a hydraulic cement which comprises heating limestone to form quicklime, and clay, shale or other silicious material to produce activated silica therein, agitating the mixture to produce a substantially homogeneous admixture and causing reaction of the said activated silicious material with the said quicklime by introducing water or steam into the mixture under agitation.

9. The method of producing a hydraulic cement which comprises heating unactivated silicious material to a relatively low temperature to convert the silicious material therein to a chemically active state and thereafter causing reaction of the said activated silicious material with quicklime in suitable proportion therein by grinding the material to a suitable fineness and introducing water or steam thereto to form the hydraulic cement.

10. The method of producing a hydraulic cement by the interaction of quicklime and activated silicious material which comprises rendering shale, clay, or other silicious material suitably active to react with quicklime and thereafter causing combination of the said silicious material with quicklime, in suitable proportion therein so as to leave substantially no uncombined lime after reaction, by the introduction of water or steam thereto to form the hydraulic cement.

11. The method of producing a hydraulic cement which comprises heating limestone to form quicklime, and clay, shale or other silicious material to activate the silica therein, thereafter producing a substantially uniform admixture in such proportions as to leave substantially no uncombined quicklime after reaction, introducing water or steam to effect chemical union of the silica with the lime and thereafter combining the said product with Portland cement clinkers, the resulting cement having characteristics of Portland cement in addition to resisting qualities of hydraulic cement.

12. The method of producing cement which comprises separately heating limestone and clay, shale or other silicious earths to a relatively low point, sufficient to activate the silica of the clay, shale or other silicious earths, mixing the heated lime and the activated clay, shale or other silicious earths, grinding the said mixture to a suitable fineness, introducing water or steam into the mixture, combining the resulting product with Portland cement clinkers and grinding the resulting mixture to a substantially uniform composition.

13. The method of producing cement comprising separately heating limestone to produce quicklime, and clay, shale or other silicious earths to activate the silica therein, grinding the said quicklime and activated clay, shale, or other silicious earths to produce an admixture of suitable fineness, introducing water or steam into the admixture, combining the product with Portland cement and grinding the material together whereby the resulting cement, beside retaining Portland cement characteristics, will have the resistant properties of hydraulic cement.

14. The method of producing hydraulic cement comprising heating a silicious material to the order of 800° Celsius, mixing the said heated silicious material with quicklime to produce a substantially homogeneous admixture and introducing water or steam into the mixture under agitation to effect chemical union of the silica with the said quicklime.

15. The method of producing hydraulic cement which comprises heating silicious material to a relatively low point, of the order of 800° Celsius, and thereafter grinding the said material with quicklime to a suitable fineness and introducing water or steam thereto to form the hydraulic cement.

16. The method of producing cement which comprises heating silicious material to a temperature of the order of 800° Celsius for rendering it chemically active, mixing the activated silicious material with quicklime to produce a substantially homogeneous mixture, introducing water or steam into the mixture under agitation for effecting chemical union of the activated silica and the quicklime, and combining the resultant product with Portland cement clinkers, ground to a suitable fineness.

ELIAS R. WILNER.